Feb. 26, 1963    J. B. MANN    3,078,974
BRAKE OR CLUTCH MEANS
Filed June 22, 1961

Inventor
JOHN BRIEN MANN
By Toulmin & Toulmin
Attorneys 3,078,974
BRAKE OR CLUTCH MEANS
John Brien Mann, 1 David's Lane, Nottingham, England
Filed June 22, 1961, Ser. No. 128,614
Claims priority, application Great Britain June 25, 1960
10 Claims. (Cl. 192—45.1)

This invention is for improvements in or relating to brake or clutch means and is particularly concerned with provinging improved means for use with a pair of members co-axial with each other one of which is capable of rotation relative to the other wherein it is desired to release or secure the members relative to each other with one or both of the members underload. When both members are capable of rotation the invention provides clutch means and when one member is fixed and the other capable of rotation thereto the invention provides brake means.

The present invention provides clutch or brake means for use with a pair of co-axial members one of which is capable of rotation relative to the other comprising an axially inclined surface on one of the members, an axially movable ring located between the members, said ring having a plurality of pairs of locking elements pivotable about an axis transverse to the axis of rotation for wedging between the two members.

In one embodiment the members consist of a shaft having an enlarged surface to form an axially inclined surface which is surrounded by a cylindrical member co-axial therewith. Between the two members is a ring which is movable axially of the two members and the ring is provided with in one example six pairs of locking elements. Each pair of locking elements consists of an outer locking element and an inner locking element. The outer locking element is adapted for wedging the ring relative to the cylindrical member and the inner locking element for wedging the ring relative to the inclined surface on the inner member. It will be appreciated that the driving force is not transmitted through the axially movable ring but by abutment of the outer and inner locking elements.

Conveniently the six pairs of locking elements are arranged in three groups inclined to one side of a radial disposition and the other three groups inclined at the same angle on the other side of the same radial disposition. The locking elements are able to pivot about an axis transverse to the axis of rotation of the members and preferably means as for example leaf spring means are provided for biasing the locking elements in one direction. By movement of the ring axially the locking elements are brought into wedging action between the two members and may similarly be displaced from wedging action between the said members. The wedging action is to drive the three pairs of locking elements in the direction in which they are displaced at angle relative to the radius.

In an alternative construction the two members are only relatively rotatable in one direction and the locking elements are all inclined on the same side of the radial axis of the members. Such a construction would act as a ratchet and permit rotation in one direction while the locking elements would prevent rotation in the opposite direction.

In order that the present invention may be more readily understood reference will now be made to the accompanying drawings in which.

Figure 1:
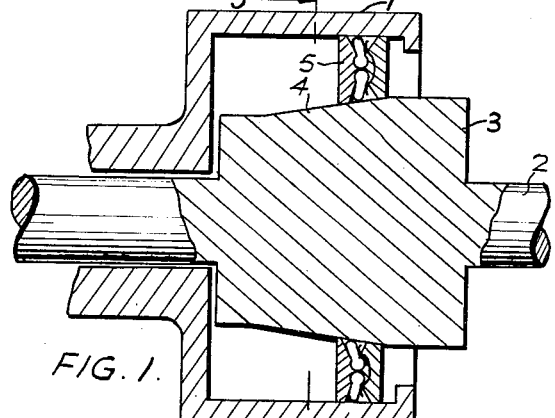
FIGURE 1 is a cross sectional view of means according to the present invention.
Figure 2:
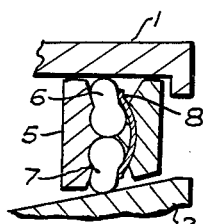
FIGURE 2 is an enlarged detailed view showing the means in the engaged position.
Figure 3:
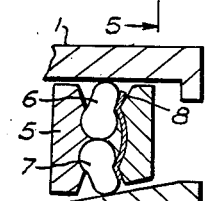
FIGURE 3 is a similar view with the means in the disengaging position.
Figure 4:
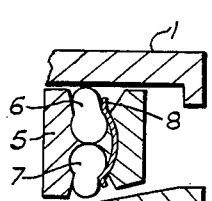
FIGURE 4 is a similar view in the disengaged position.
Figure 5:
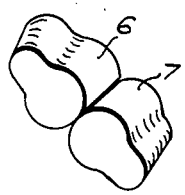
FIGURE 5 is a perspective detailed view of a pair of locking elements according to the present invention.
Figure 6:
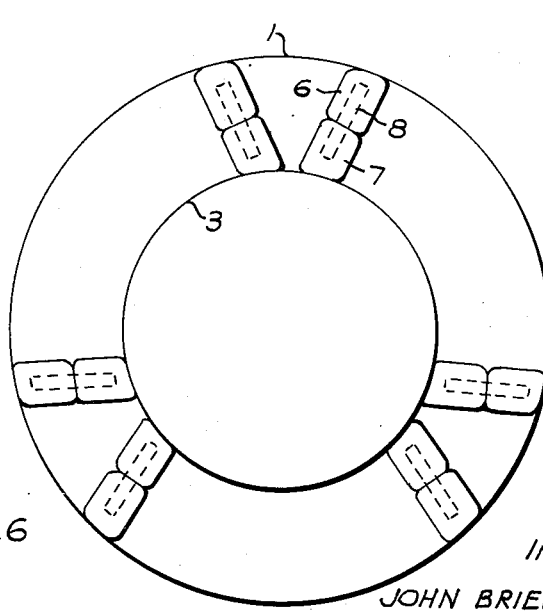
FIGURE 6 is a schematic cross sectional view on the line 5—5 of FIGURE 1.

In the figures a shaft 2 has an enlarged boss 3 provided with an axially inclined surface 4 surrounding the surface 4 is a cylindrical member 1. The shaft 2 and the cylindrical member 1 constitute a pair of relatively rotatable members which are to be locked and released relative to each other by clutch means which consist of a ring 5 having located therein six pairs of locking elements 6 and 7 such that the locking elements 6 and 7 can pivot about an axis transverse to the axis of the shaft 2. The locking elements 6 and 7 are arranged in groups of three pairs such that three of the pairs of locking elements are disposed at angle on one side of a radial disposition while the other three are arranged at similar angle on the other side of a radius. A leaf spring 8 is provided which biasses the locking elements into the position illustrated in FIGURE 2, i.e. the locked position of said locking elements. The locking elements 6 and 7 each consist of member which at one end has a form of part of a cylinder. It is this end which is located in the ring 5. At the other end the locking elements have a convex surface for engagement with either the surface 4 of the member 3 or of the surface of the cylinder 1. A locking arrangement between the member 3 and the member 1 is obtained by displacing the ring 5 to the right (FIGURE 1) so that the locking elements are wedged between the surface 4 and the member 1. The ring 5 may be displaced by any convenient means such as for example by mechanical linkage, or by hydraulic or electric actuator motion, a suitable ring being connected to the ring 5 and to the prime mover for causing movement thereof. If the member 3 is to rotate in a clockwise direction as viewed in FIGURE 6 drive is transmitted to the member 1 to rotate in a clockwise direction by a wedging of the locking elements 6 and 7 to the right of the radius between the members. If the member 3 is rotating in an anti-clockwise direction as seen in FIGURE 6 the three pairs of locking elements displaced to the left of the radius will be wedged between the member 1 and the surface 4. The angle which the locking elements are disposed relative to the radius is dependent upon the material of which said elements are composed as well as the material of the surface 4 and the member 1 and the mutual co-efficient of friction between said materials. In the normal disengaged position the locking elements 6 and 7 are biassed to the position illustrated in FIGURE 4. To engage the clutch means the ring 5 is displaced to the right as seen in FIGURE 1 until the rotating members wedge the locking elements between them. In the position as seen in FIGURE 2 the locking elements 6 and 7 are firmly located in wedged position between members 1 and 3 and the ring 5 is unable to move to the left under the influence of any wedging action because the locking elements 6 and 7 are themselves pivoted and displaced slightly to the left of the center line. It therefore requires a small additional force to disengage the clutch while under load so that the locking elements 6 and 7 may roll relative to each other and to displace themselves against the influence of the leaf spring 8. When they are disposed on the opposite side of the center line as illustrated in particular in FIGURE 3, the ring can be moved axially to the left FIGURE 3 and the clutch disengaged. As the ring 5 is further moved to the disengaged position FIGURE 4 the leaf spring returns the locking elements to the engaged position so that they may be again moved into engaging position. The action of the leaf spring in biassing the locking elements into the engaged position enables them to have a "lead in" when the ring is moved into the engaged position.

The present invention provides a simple and convenient form of clutch which enables a pair of rotatable members to be released and locked relative to each other by the application of a small force when one or both said members is underload.

What I claim is:

1. Brake or clutch means having inner and outer co-axial members one of which is capable of rotation relative to the other, said inner member having an axially inclined surface, an axially movable ring located between said members, a plurality of pairs of locking elements carried by said ring and mounted for pivotal movement about axes transverse to the axis of rotation of said members for wedging between said members to hold them rotationally coupled to each other.

2. Means according to claim 1, in which the pairs of locking elements are located on an axis inclined to the radial axis of the axially inclined surface.

3. Means according to claim 2, in which the pairs of locking elements are arranged in groups of two, one pair in each group being located on an axis to one side of the radial direction of the axially inclined surface and the other pair in a group being located on the other side of the said radial direction of the axially inclined surface.

4. Means according to claim 1 in which the axially inclined surface is formed from a shaft having a frustro-conical section.

5. Means according to claim 4, in which the member co-axial with the shaft having the frustro-conical section is a cylindrical member surrounding said section.

6. Means according to claim 5, in which the locking elements comprise an outer locking element for engagement with the inner surface of the cylindrical member and an inner locking member for engagement with the surface with the frustro-conical section.

7. Means according to claim 1 in which the pairs of locking elements are in mutual abutment within the ring when in locking position.

8. Means according to claim 1 having six pairs of locking elements.

9. Means according to claim 1 further having means for biassing the locking elements in one direction about their transverse axis.

10. Means according to claim 9, in which said means comprise a leaf spring located within the ring.

References Cited in the file of this patent

UNITED STATES PATENTS

| | | |
|---|---|---|
| 1,933,436 | Kalmar | Oct. 31, 1933 |
| 2,268,376 | Dodge | Dec. 30, 1941 |
| 2,427,120 | Blair | Sept. 9, 1947 |

FOREIGN PATENTS

| | | |
|---|---|---|
| 1,093,409 | France | Nov. 17, 1954 |
| 860,604 | Great Britain | Feb. 8, 1961 |